US005259738A

United States Patent [19]

Salter et al.

[11] Patent Number: 5,259,738

[45] Date of Patent: Nov. 9, 1993

[54] FLUID-WORKING MACHINE

[75] Inventors: Stephen H. Salter; William H. S. Rampen, both of Edinburgh, United Kingdom

[73] Assignee: University of Edinburgh, Edinburgh, United Kingdom

[21] Appl. No.: 854,653

[22] PCT Filed: Sep. 27, 1990

[86] PCT No.: PCT/GB90/01478

§ 371 Date: Mar. 23, 1992

§ 102(e) Date: Mar. 23, 1992

[87] PCT Pub. No.: WO91/05163

PCT Pub. Date: Apr. 18, 1991

[30] Foreign Application Priority Data

| | | | |
|---|---|---|---|
| Sep. 28, 1989 | [EP] | European Pat. Off. | 89309900.2 |
| Sep. 28, 1989 | [ZA] | South Africa | 89/7398 |
| Sep. 28, 1989 | [WO] | World Int. Prop. O. | PCT/GB90/01146 |
| Mar. 21, 1990 | [GB] | United Kingdom | 9006323 |

[51] Int. Cl.[5] ........ F04B 39/08

[52] U.S. Cl. ........ 417/505; 417/270

[58] Field of Search ........ 417/269, 270, 505; 251/129.16; 91/476

[56] References Cited

U.S. PATENT DOCUMENTS

| | | | |
|---|---|---|---|
| 2,785,638 | 3/1957 | Moller | 91/505 |
| 3,679,328 | 7/1972 | Cattanach | 417/270 |
| 3,712,758 | 1/1973 | Lech | 417/270 |
| 4,541,394 | 9/1985 | Schmechter | 417/505 |
| 4,579,145 | 4/1986 | Leiber | 251/129.16 |
| 4,763,163 | 6/1987 | Kushida | 251/129.16 |
| 5,088,520 | 2/1992 | Haynes | 251/129.16 |
| 5,110,087 | 5/1992 | Studtmann | 251/129.16 |

FOREIGN PATENT DOCUMENTS

| | | |
|---|---|---|
| 0084070 | 7/1983 | European Pat. Off. . |
| 0102780 | 3/1984 | European Pat. Off. . |
| 0361927 | 4/1990 | European Pat. Off. . |
| 3312054 | 11/1984 | Fed. Rep. of Germany . |
| 288540 | 1/1953 | Switzerland . |
| WO8705981 | 10/1987 | World Int. Prop. O. . |

*Primary Examiner*—Richard A. Bertsch
*Assistant Examiner*—Peter Korytnyk
*Attorney, Agent, or Firm*—Dann, Dorfman, Herrell and Skillman

[57] ABSTRACT

A multi-chamber fluid working machine has at least one electromagnetically controlled poppet valve linking each working chamber with respective high and low pressure fluid manifolds whereby displacement control is achieved by real time control of the electrically selectable poppet valves. Each valve seals via annular parts on the valve and its seat and is moved by reaction between a solenoid coil and a ferromagnetic part on the valve stem.

9 Claims, 4 Drawing Sheets 21
22
20
10
11
12
13
14
14a
15
16
23
24
25
26
27
28

11
12
35
14
30a
30
31
13
34
32
33

24
23
25
69
12
10
13
14
70
15
71
68
16
65
63
67
26
51
50
22
66
52
53
55
54
20
60
28

FLUID-WORKING MACHINE

FIELD OF THE INVENTION

This invention relates to a fluid-driven (motor) and-/or fluid-driving (pump) machine having a plurality of working chambers of cyclically changing volume and valve means to control the connection of each chamber sequentially to low-and high-pressure manifolds.

This invention has particular reference to non-compressible fluids, but its use with gases is not ruled out. It has particular reference to machines where each chamber is a piston reciprocating in a cylinder, but its use with chambers delimited by flexible diaphragms or rotary pistons is not ruled out.

SUMMARY OF THE INVENTION

The invention employs electromagnetic means to control the operation of the valve means. Using electromagnetic means opens the possibility for full electronic control with all the sophistication and precision that that makes possible.

According to the invention a fluid-working machine having a plurality of working chambers of cyclically changing volume, a high-pressure fluid manifold and a low-pressure fluid manifold, a plurality of electromagnetically controlled valves at least one such valve linking each working chamber respectively to each manifold, and sequencing means for operating the valves in timed relationship with the changing volumes of the chambers, is characterised in that each valve seals the respective chamber from the respective manifold by engagement of an annular valve part with an annular valve seat, in that a solenoid is provided to magnetically move the valve part relative to the seat by reacting with ferromagnetic material on the valve and in that at least one valve is a poppet valve having a stem and an enlarged head, the annular valve part being provided on the head and the ferromagnetic material being provided on the stem. Preferably the solenoid coil surrounds the stem and reacts with an annular piece of ferromagnetic material on the stem. Conveniently the ferromagnetic material on the stem of said at least one valve moves in the magnetic field of a permanent magnet fixed relative to the manifolds, said permanent magnet acting with the ferromagnetic material to latch the valve in a position in which the valve part is spaced from the seat or a position in which the valve part seals to the seat. Desirably the solenoid coil, permanent magnet and ferromagnetic material are all annular, the ferromagnetic material moving with the valve stem alternately into magnetic engagement with the coil and the magnet.

Preferably, energising pulses for operating the at least one solenoid are generated by a microprocessor controller receiving as input, inter alia, data relating to working chamber volume and the desired rate of working.

In a preferred arrangement, computer-controlled electromagnetic poppet valves are used to connect each cylinder of a multi-cylinder piston hydraulic motor to the associated low-pressure manifold and to the associated high-pressure manifold.

In a further arrangement a fluid-working pump is provided which has computer-controlled electromagnetic poppet valves and a "look-ahead" facility to improve the sensitivity of control.

BACKGROUND OF THE INVENTION

EP-A-0361927 describes such a pump but gives no hint as to how to solve the difficulty which comes when attempting to use the principle behind operating a fluid pump for operating a motor, namely how to open the valves against a positive pressure. To use poppet valves in a motor one must either apply a large force to them or supply carefully controlled timing pulses so that each valve only moves when the pressures on opposite sides of it are substantially equal. This specification is concerned with the latter approach in the case of the application of the invention to a motor.

The operational cycle of an hydraulic motor consists of two phases; the first is the power stroke, where the working chamber is exposed to the high-pressure manifold until it is forced to its maximum volume position. The second phase is the exhaust stroke where the valving is rearranged to connect the chamber to the low-pressure manifold and the volume is driven back to the minimum volume position. Normally, commutating ports are used to make the appropriate manifold/chamber connections. These are acceptable unless the standard of filtration is low since the clearance of the interfaces at the commutating ports must be kept small for leakage reasons. The commutating port design also requires a rather delicate design trade-off between leakage and shear losses which are completely eliminated with poppet valves.

BRIEF DESCRIPTION OF THE DRAWINGS

The invention will now be further described, by way of example, with reference to the accompanying drawings, in which.

DESCRIPTION OF THE PREFERRED EMBODIMENT

Figure 1:
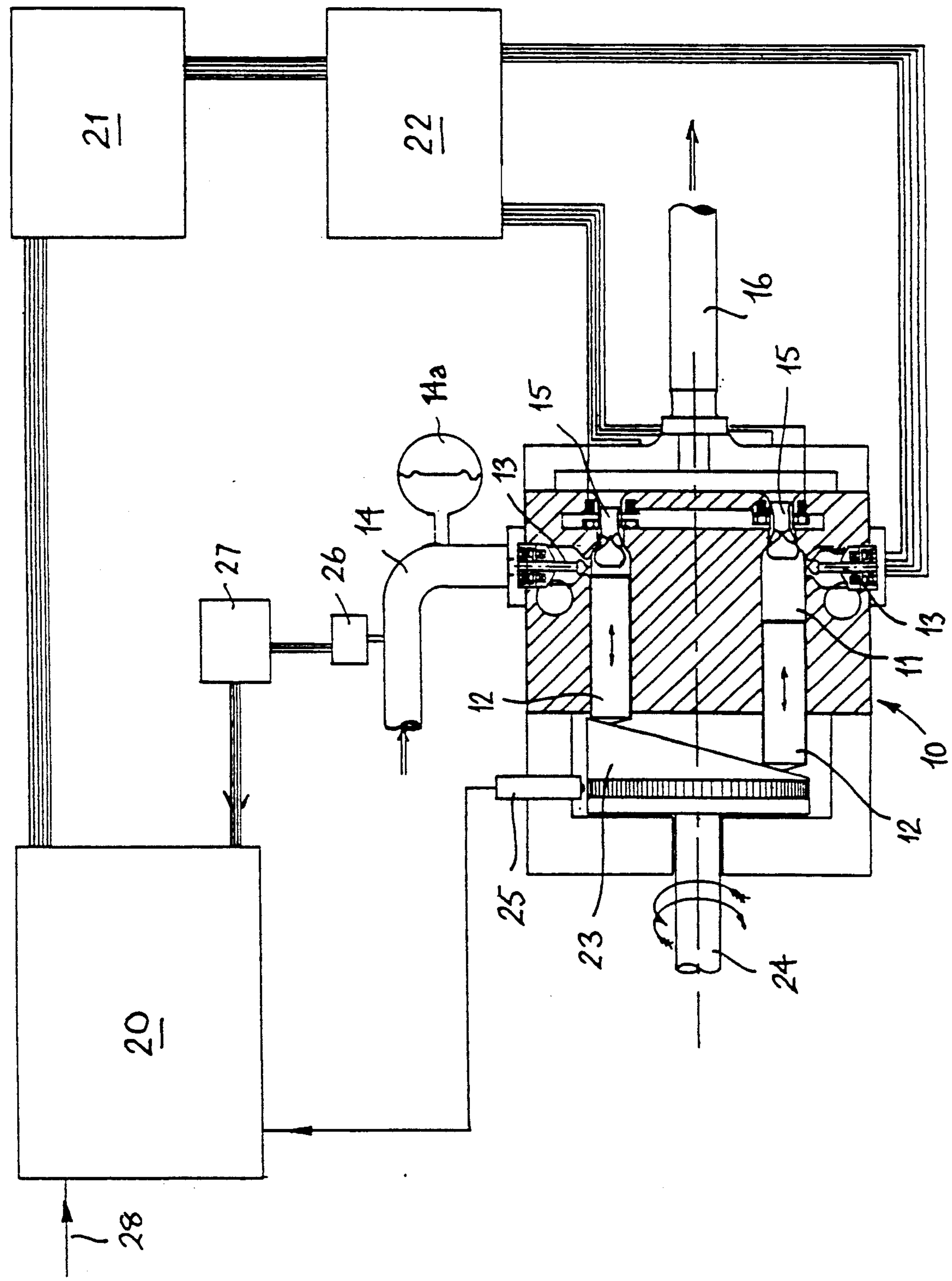
FIG. 1 is a schematic sectional view of a multi-piston hydraulic motor with associated control equipment.

Referring to FIG. 1, a multi-piston hydraulic motor 10 is shown in schematic section, the cylinders being marked 11 and the reciprocating pistons 12. In the side wall of each cylinder 11 is a poppet valve 13 communicating with a high-pressure manifold 14 and in the end wall of each cylinder is a poppet valve 15 communicating with a low-pressure manifold 16. The poppet valves 13 and 15 are active electromagnetic valves controlled electrically by a microprocessor controller 20 feeding control signals, via optoisolators 21, to valve-driving semiconductors 22.

The pistons 12 act on a drive cam 23 fast to an output shaft 24, the position of the cam 23 being sensed by an encoder 25.

In a similar manner to that described in the specification of the aforementioned European application, the controller 20 receives inputs from the encoder 25, a pressure transducer 26 (via an analogue to digital converter 27) and via a line 28 to which a desired output speed demand signal can be applied.

Figure 2:
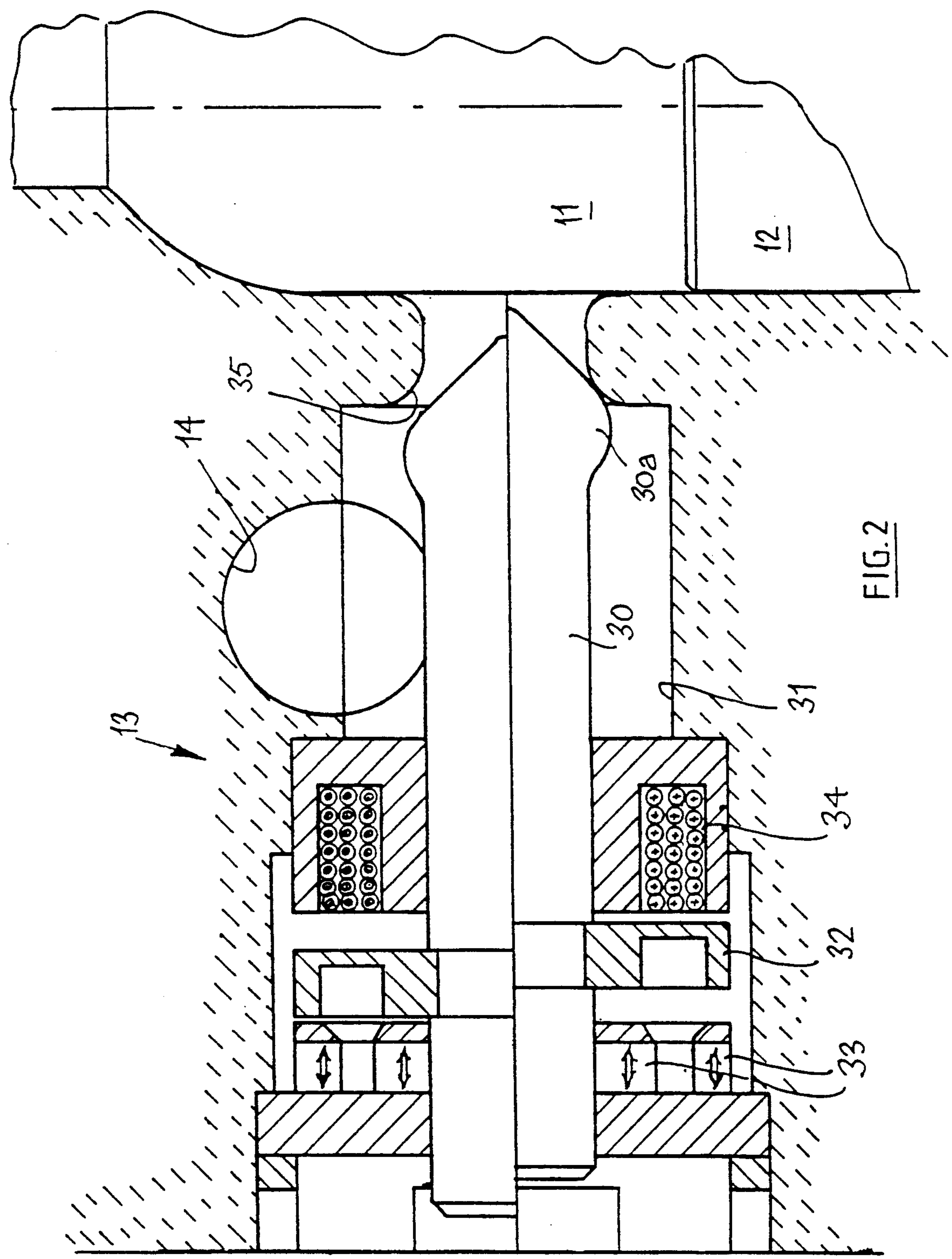
FIG. 2 is an enlarged sectional view of one of the cylinder side high-pressure poppet valves of the motor of FIG. 1 shown closed in the bottom half and open in the upper half.
Figure 3:
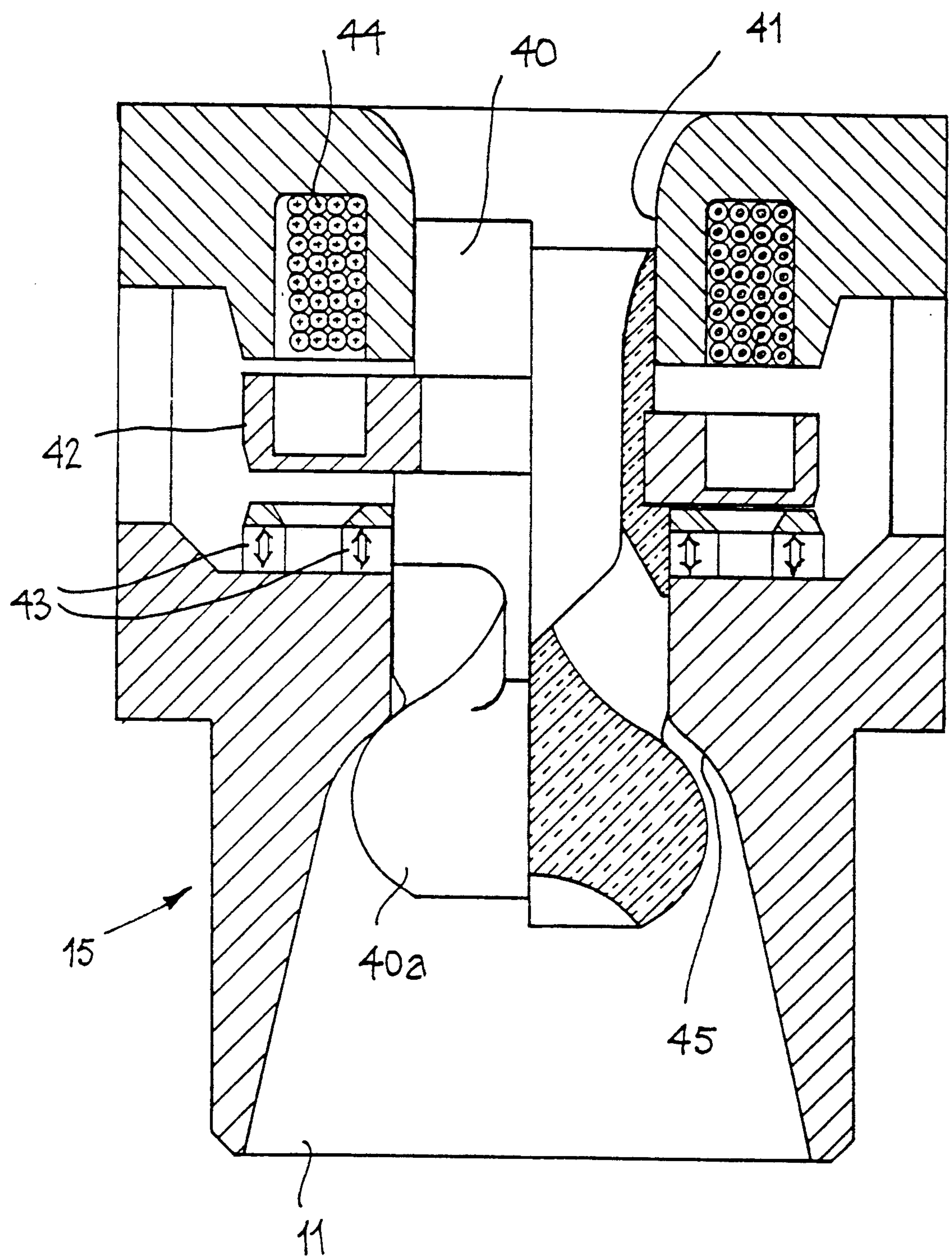
FIG. 3 is an enlarged sectional view of one of the cylinder end low-pressure poppet valves of the motor of FIG. 1 shown closed to the left and open to the right.

The poppet valves shown in FIGS. 2 and 3 are similar insofar as each has the active valve member (shown as 30 in FIG. 2 and 40 in FIG. 3) axially slidable in the valve passage (31, 41) under the influence of an annular magnetic pole (32, 42) sandwiched between a permanent magnetic ring (33, 43) and a solenoid coil (34, 44). The enlarged head (30*a*, 40*a*) of each valve provides an annular valve part which seals to an annular poppet valve seat (35, 45) but in the case of the valve 30 high pressure in the cylinder 11 tends to lift the head 30*a* off the seat 35 whereas in the case of the valve 40 such high pressure will urge the head 40*a* into sealing engagement with the seat 45. Each valve (30, 40) has a natural state which is open and is pulled closed when the appropriate solenoid coil (34, 44) is energised. It should be noted however that other arrangements are possible (e.g. there is no permanent bias and solenoid switching between open and closed positions (via two magnet coils) is used). The shaft position of the motor is read by the encoder 25 and monitored by the valve controller 20.

If the cycle is considered to start part way into the power stroke, then the high-pressure valve 30 has been opened and is being held against the flow while the low-pressure valve 40 is being held closed against its seat by the pressure differential between the cylinder 11 and the manifold 16. When the piston 12 is almost at bottom-dead-centre, the controller 20 sends a pulse to close the high-pressure valve 30. Once the valve is closed, the cylinder pressure drops with the remaining downward motion of the piston 12 until, at bottom-dead-centre, it has reached the level of the low-pressure manifold 16. The low-pressure valve 40 can now be opened, either with a second timed pulse or, in the case of the permanently biased valve of FIG. 3, on its own initiative. The piston 12 is now driven upwards until it has almost finished exhausting the cylinder 11. At this point a timed pulse closes the low-pressure valve 40 and the residual motion of the piston is used to raise the cylinder pressure of the cylinder until it allows the high-pressure valve 30 to be opened. This staging of the valve timing to ensure a small pressure difference across the valves is very important in practice.

On start-up, the system must pre-configure the valves (30, 40) with the high-pressure manifold 14 disconnected so that, on its re-connection, the shaft 24 will begin to rotate in the preferred direction. This means that the controller 20 will have to read both the shaft encoder 25 and a direction switch before pulsing the valves into a start-up configuration. Direction reversal involves shutting the pressure off, reconfiguring the valves and, finally, re-applying system pressure to manifold 14.

If the shaft 24 begins to drive the motor, it will not function as a pump but as a low-rate damper. With the valves of FIGS. 2 and 3, the effect of over-run will occur in two phases: The first thing to happen will be an increase of shaft speed since both the load and fluid pressure are acting together. Left unchecked this will proceed to the second phase where the fluid, throttled by the valve seat, will generate a large enough pressure drop to close the high-pressure valve 30 part way through the power stroke. The low-pressure valve 40 will then be opened by the pressure differential for the remaining stroke until the piston 12 reaches bottom-dead-centre. The controller 20, if it continues to play its motor role, will leave the low-pressure valve open for the discharge stroke. The next power stroke will begin as normal but will once again revert into a low-pressure suction stroke once the high-pressure valve 30 is closed by the pressure differential. If the controller 20 is programmed to recognise the overrun condition (e.g. by monitoring increase of shaft speed, valve position or the high-pressure manifold pressure), it could transform the motor into a pump by revising the valve actuation cycle. On sensing over-run, the controller 20 would close low-pressure valves 40 as pistons 12 approached bottom-dead-centre and also momentarily close the high-pressure valves 30 at top-dead-centre (until the pressure built up sufficiently to hold them closed). On sensing an end to the over-run state, the controller 20 would convert each cylinder 11 back to motor operation as it approached a point in the cycle where it was possible to do so. The ability to change from motoring to pumping allows a machine according to this invention to be used for regenerative braking of the output shaft.

Most motors capable of varying the shaft speed for a given flow-rate do so through the use of some form of variable stroke facility. A motor according to this invention would allow cylinder disabling in much the same way as is described in the aforesaid European patent application for a pump, though in this case the low-pressure valve 40 would be left open at the end of the exhaust stroke so that the high-pressure valve 30 could not open for the power stroke immediately following. Shaft speed will be inversely proportional to the number of enabled cylinders since a partially disabled motor will turn through more revolutions, than a fully enabled one, in order to consume the same amount of fluid.

Figure 4:
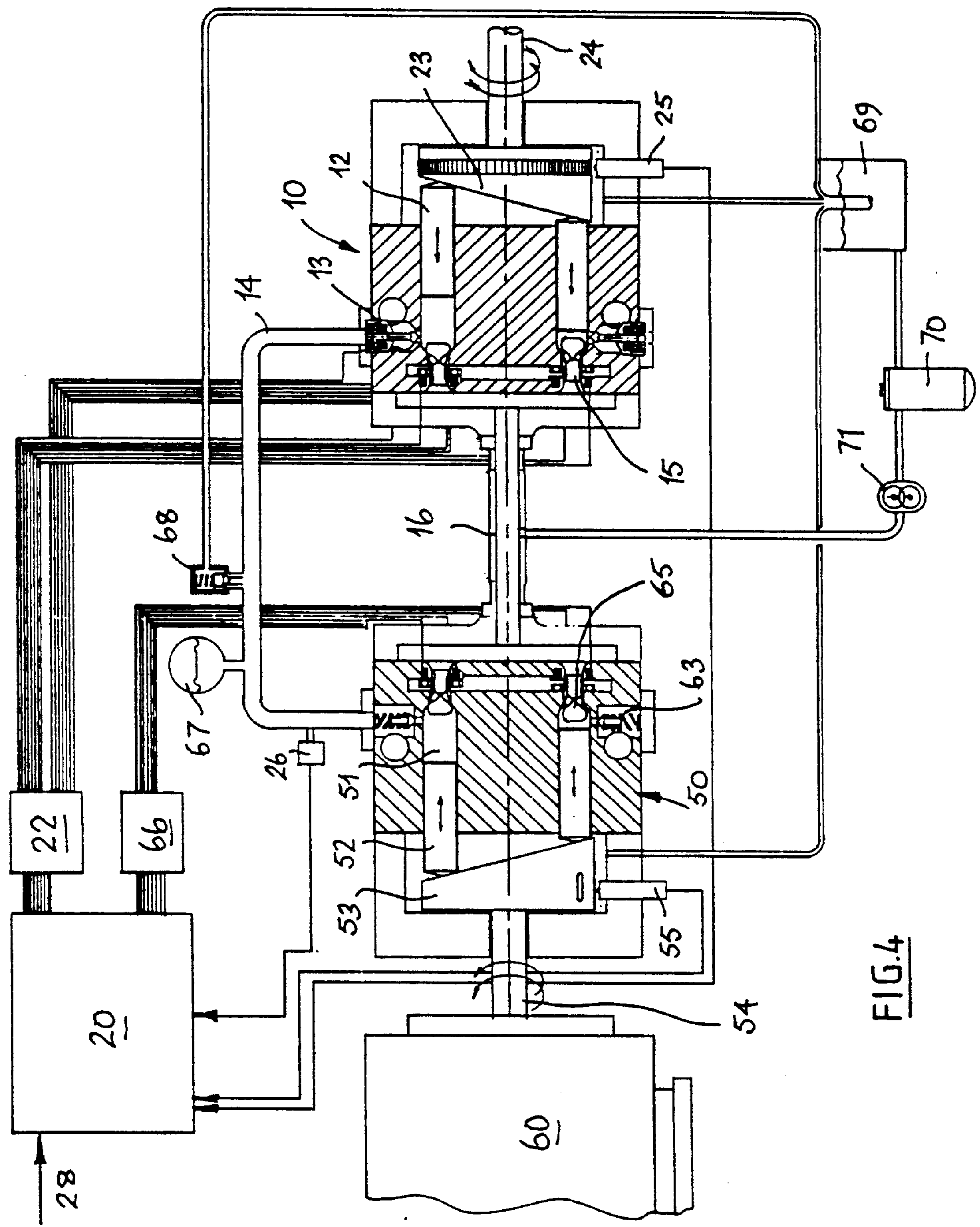
FIG. 4 is a schematic sectional view of a linked hydraulic motor and pump to provide a variable speed transmission unit on the output of a prime mover.

If the motor 10 were to be directly coupled to the output of the previously described pump 50 then a versatile variable speed transmission would result (as shown in FIG. 4). The usual problem in coupling a fixed displacement machine to a variable one is that the system must be sized according to the peak power requirement at both extremes of the speed/torque range. This means that one of the components spends most of its time working far below its rated capacity and, in a mobile application, also imposes performance penalties for the extra weight. If both units are variable and the controller 20 has a system-managing look-up table for controlling both system pressure and output shaft speed, then the system can be run more efficiently. The controller could, at its option, obtain the same input-/output shaft speed ratio by pumping fluid at a high rate at a low pressure, or, the reverse, with a low flow-rate and a high pressure.

The important thing to consider in the design of a power transmission is that there is the necessity of dealing with the over-run condition as well as direction reversal. The output of the pump 50 can be cut within a half revolution, if required, to effect a pressure-off condition and allow valve re-configuration for reversing. On the over-run, a motor able to act as a pump will add to the actual pump's output which will cause the system pressure to rise and the controller to disable all pump cylinders until normal conditions return. The unwanted fluid (and energy) in the high-pressure manifold could either then be spilled off via a relief valve or stored in an accumulator.

FIG. 4 also shows how a prime mover 60 drives the pump shaft 54 to reciprocate pistons 52 in pump cylinders 51 via a cam plate 53, Solenoid poppet valves 65 of the pump 50 are electrically controlled via pump valve drivers 66 linked to the controller 20. Pump piston position is signalled by a shaft trigger 55. The high pressure manifold 14 is linked to the pump cylinders 51 via spring-urged outlet valves 63.

A pressure accumulator 67 is provided in the manifold 14 which also includes an over-pressure relief valve 68 coupled to a reservoir 69 which feeds a boost pump 71 via a filter 70.

As is made clear in the aforesaid European application, by virtue of the electrical control of the inlet valves of a reciprocating hydraulic pump, significant and advantageous consequences arise which are not possible with pumps having mechanically controlled valves and this will now be described with reference to FIG. 1.

FIG. 1 shows a multi-piston motor 10 having a ring of pistons 12 driving a cam 23 and making a cam shaft 24 rotate. Operating as a pump, each piston 12 would reciprocate in its cylinder 11 under the driving influence of the rotating cam 23, drawing hydraulic liquid into the cylinders 11 from the low pressure manifold 16 via the electromagnetically controlled valves 15 during each inlet stroke. At bottom-dead-centre (BDC) each piston 11 reverses direction of movement to start its delivery stroke, and if the respective valve 15 is closed, the hydraulic liquid is forced via open valve 13 into the high pressure manifold 14.

In operation as a pump, the micro-processor controller 20 is used to control the opening and closing of the valves 13 and 15. Shaft trigger signals are generated by transducer 25 sensing the rotation of the cam 23 and are fed to the controller 20 with a digital input on line 28 related to pump output demand and a digital input from an analogue/digital converter 27 connected to the pressure transducer 26.

The unit 20 provides a digital output which controls a bank of solenoid drivers 22.

The microprocessor control unit 20 could contain several built-in algorithms which enable the unit to compare the pump system demand characteristics with system feedback and which outputs a signal on actuation of a cylinder and which causes the next cylinder to reach BDC to become enabled should the system require its displacement of fluid. This algorithm would desirably be tempered with a maximum rate of change algorithm which would prevent sudden surges. Thus, the actual operating displacement characteristics of the pump system are electromagnetically modified in accordance with the desired demand displacement characteristics. The enabling pulse would then be sent to the solenoid driver 22 after being timed by the noise algorithm in order to just close the valve 15 of a module by the time the piston 12 in that module reached BDC. In this way the shock wave generated by late valve closing is reduced.

The hardware illustrated in FIG. 1 can operate for example when the machine is pumping, in two different modes, a flow control mode and a pressure control mode.

Flow Control Mode

The controller 20 keeps a running account of the displacement demand (from either a fixed level or an external input such as an operator joystick) and the displacement produced by the pump. At each cylinder enabling opportunity the controller 20 decides whether the demand foreseen at the time of maximum effectiveness of the current cylinder justifies its being enabled. This occurs if the displacement account will be at a deficit of more than half of a cylinder. An accumulator 14*a* (shown connected to the manifold 14) is sized so that a half cylinder error will cause less than 10% variation in line pressure. This control method is, in itself, open loop since no feedback is used. Feedback can be applied by positioning a summing junction prior to the demand input 28 of the microprocessor controller 20.

Pressure Control Mode

In this situation the controller 20 attempts to maintain the required pressure on the output line irrespective of the demand function. What it is actually doing is trying to keep the accumulator volume as close to the zero error state as possible. To know the pumping requirements the system has to calculate the flow from the output to the load. This can be done by measuring the system pressure at two consecutive cylinder decision intervals. The change in pressure equates to a change in accumulator volume which indicates the displacement contribution from the accumulator 14*a* to the system. The displacement delivered by the pump during the time interval is calculated from the records of the previously enabled cylinders. The output flow is the sum of pump and accumulator flow (since the flow is incompressible for these purposes).

The output flow demand, the displacement from the committed cylinders and the displacement to the accumulator (to restore it to the zero error position) are then combined to allow a decision on whether to enable the current cylinder.

The microprocessor controller 20 can be equipped with different inputs including, for example:

1. Pump system demand characteristics for example from a potentiometer, a throttle pedal (in the case of a pump used for vehicle drive), or a digital set-point.
2. Pump system feed back signals, for example from a motor speed sensor.
3. Noise sensor, for example an accelerometer, located on the pump casing.

It will be readily appreciated from the above that, because of the ability to control the valve 15 of each piston and cylinder module of a pump within every cycle of the pump, a pump, particularly a pump with a substantial number of cylinders, is capable of more or less infinite variation in displacement. This differs from the stepped type of variation possible in pumps heretofore.

It will, for example, be possible to programme the operation of a pump so that its output varies from cycle to cycle. Alternatively, a pump can be divided into a number of independently operable sections each comprising a plurality of cylinders. Each section can be independently controlled as to displacement and used for operating separate machines.

In a manner analogous to that described above, the machine shown in FIG. 1 can be operated as a motor in at least two different modes.

Variable displacement/rotation speed mode (open loop)

This is the equivalent of the flow control mode in pump operation. The controller 20 generates an enabling sequence which uses the accumulated displacement error criterion to ensure maximal smoothness. The speed is inversely proportional to the enabled/available cylinder ratio. For a continuous positive torque, the top speed limit is defined by that achieved when a single cylinder is enabled at all points of the rotation (i.e. a minimum of two cylinder enablings per revolution). The minimum speed occurs when all cylinders are enabled. In a 6 cylinder pump this gives a speed range of ⅓ to full for a given amount of flow.

Rotation Speed Control (closed loop)

This is the equivalent of the pressure control mode in pump operation. Here the output shaft speed is fed back to the controller 20. The cylinder enabling algorithm extrapolates the displacement required by the motor in order to make the required rotation in the time to the maximum effectiveness of the decision cylinder. It incorporates the displacement consumption of previously enabled cylinders in the coming time in order to reach its enabling decision. This process not only ensures relatively accurate speed control but also maintains positional accuracy (i.e. total number of revolutions).

The drawings have illustrated axial cylinders but the invention is applicable to any configuration of pump or motor in which the poppet valves are stationary and a radial ring-cam configuration is particularly suitable.

I claim:

1. A fluid-working machine having a plurality of working chambers of cyclically changing volume, a high-pressure fluid manifold and a low-pressure fluid manifold, a plurality of electromagnetically controlled valves at least one such valve linking each working chamber respectively to each manifold, and sequencing means for operating the valves in timed relationship with the changing volumes of the chambers, characterised in that each valve seals the respective chamber from the respective manifold by engagement of an annular valve part with an annular valve seat, in that a solenoid is provided to magnetically move the valve part relative to the seat by reacting with ferromagnetic material on the valve and in that at least one valve is a poppet valve having a stem and an enlarged head, the annular valve part being provided on the enlarged head and the ferromagnetic material being provided on the stem.

2. A machine as claimed in claim 1, characterised in that the solenoid coil surrounds the stem and reacts with an annular piece of ferromagnetic material on the stem.

3. A machine as claimed in claim 1 characterised in that the ferromagnetic material on the stem of said at least one valve moves in the magnetic field of a permanent magnet fixed relative to the manifolds, said permanent magnet acting with the ferromagnetic material to latch the valve in a position in which the annular valve part on the enlarged head is spaced from the annular valve seat or a position in which said annular valve part seals to the annular valve seat.

4. A machine as claimed in claim 3, characterised in that the solenoid coil, permanent magnet and ferromagnetic material are all annular, the ferromagnetic material moving with the valve stem alternately into magnetic engagement with the coil and the magnet.

5. A machine as claimed in claim 1 characterised in that energising pulses for operating the at least one solenoid are generated by a microprocessor controller receiving as input, inter alia, data relating to working chamber volume and the desired rate of working.

6. A machine as claimed in claim 5, when operating as a motor in which the controller generated energising pulses are timed so that each valve only moves when the pressures on opposite sides of each valve are substantially equal.

7. A machine as claimed in claim 5, when operating as a pump, in which controller generated energising pulses are only fed to a valve to enable a working chamber if the demand for pressurised fluid foreseen at the relevant time justifies its being enabled.

8. A machine as claimed in claim 5, when operating as a pump, in which controller generated energising pulses are timed to minimise the noise output from the pump.

9. A machine as claimed in claim 5, when operating as a motor in which controller generated energising pulses are timed on the basis of the displacement of fluid required by the motor in order to make the required rotation in the time to the maximum-effectiveness of the decision cylinder.

* * * * *